Oct. 1, 1957  R. W. VARRIAL  2,807,988
MACHINING TOOL
Filed June 25, 1954  2 Sheets-Sheet 1

INVENTOR.
RALPH W. VARRIAL
BY: Beau, Brooks, Buckley & Beau,
ATTORNEYS.

Oct. 1, 1957 — R. W. VARRIAL — 2,807,988
MACHINING TOOL
Filed June 25, 1954 — 2 Sheets-Sheet 2

INVENTOR.
RALPH W. VARRIAL
BY
Beau, Brooks, Buckley & Beau,
ATTORNEYS.

United States Patent Office 2,807,988
Patented Oct. 1, 1957

2,807,988

MACHINING TOOL

Ralph W. Varrial, Niagara Falls, N. Y., assignor to Bell Aircraft Corporation, Wheatfield, N. Y.

Application June 25, 1954, Serial No. 439,175

6 Claims. (Cl. 90—24)

This invention relates to machining tools, and more particularly to an improved hand tool for "spotting" or "flaking" metal bearing surfaces such as from time to time wear smooth, and thereupon no longer retain lubricating oil in satisfactory manner. One example of bearing surfaces such as periodically require de-smoothing as referred to hereinabove are surface plates or "ways" of a milling machine. In order to provide such surfaces in proper condition to retain lubricating oil it has heretofore been standard practice to submit such surface plates to gouging or scuffing treatments by means of relatively large factory-based machines; whereas a primary object of the present invention is to provide an improved hand tool type machine for the indicated purposes which is readily portable and adapted to be handled with maximum facility to de-smooth such machine components in situ.

Another object of the invention is to provide an improved machine tool as aforesaid which is relatively inexpensive to assemble, yet which is rugged and foolproof in operation, and relatively light weight.

Another object of the invention is to provide an improved hand tool as aforesaid which embodies mechanical means rendering the tool substantially self-feeding and in the direction of work progression.

Other objects and advantages of the invention will appear in the specification hereinafter.

An example of a machine embodying the features of the invention is illustrated in the accompanying drawings wherein.

Figure 1:
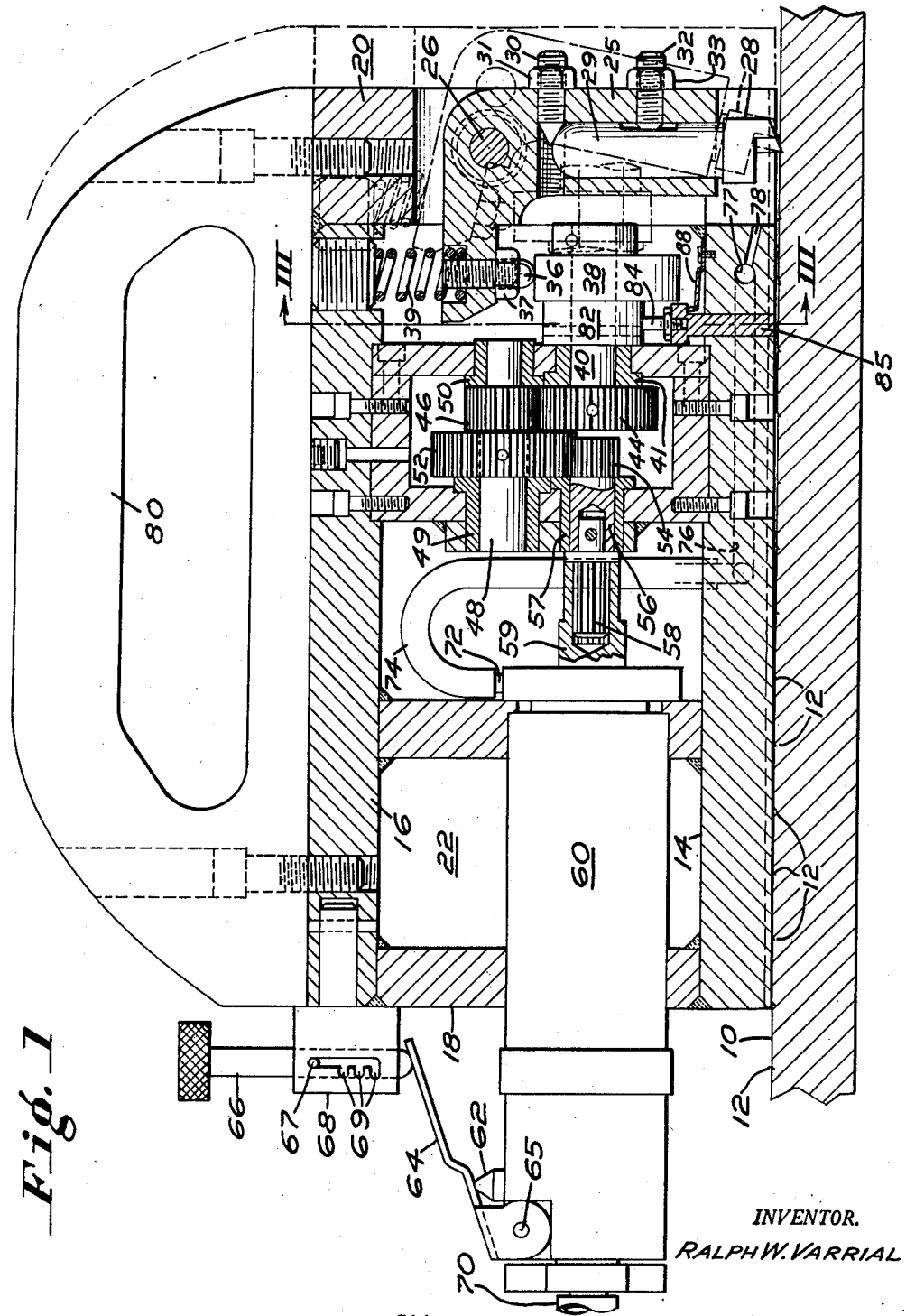
Fig. 1 is a longitudinal vertical sectional view through a hand tool of the invention.
Figure 2:
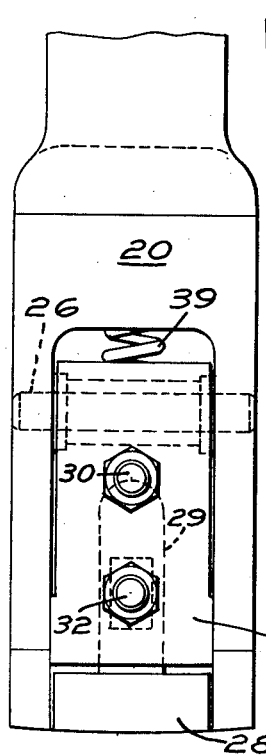
Fig. 2 is a front end view thereof.
Figure 3:
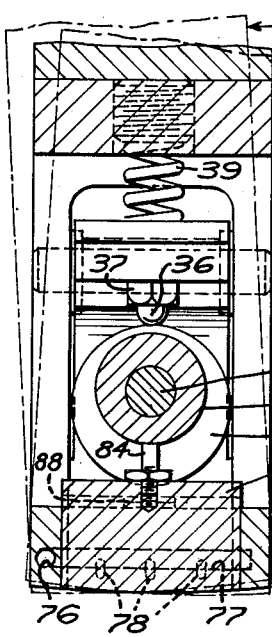
Fig. 3 is a sectional view taken along lines III—III of Fig. 1.

As shown in Figs. 1, 2, 3, the invention may be embodied in a hand tool type machine such as is readily portable and carried by the machine operator in one hand for the purpose of de-smoothing any metal plate surface as indicated at 10 by scuffing the latter as indicated at 12. As shown in the drawing the tool comprises a generally rectangularly shaped housing including a base plate 14; a top plate 16; a rear end plate 18; a front end plate 20; and opposite side plates 22—22. The front end plate 20 is fork-shaped in front view to accommodate in substantially nested relation therein a bell-crank shaped tool holder 25 which is pivotally mounted within the front plate 20 by means of a horizontal transverse pivot pin 26. The vertically disposed arm portion of the bell-crank shaped housing 25 is vertically bored so as to receive in slip-fitted relation therein the tool cutter blade designated 28; the blade 28 being generally of inverted T-shape in form and having an upwardly extending stem portion 29 which slip-fits into a correspondingly bored portion of the holder 25. A conically pointed machine screw 30 extends thorugh the holder into engagement with the upper end of the blade stem 29, whereby screw-threaded adjustment of the screw 30 will regulate the vertical disposition of the blade in the holder 25. A lock nut 31 is provided on the screw 30 for retaining the latter in any adjusted position. A blade holding set screw 32 is also provided in screwthreaded engagement with the holder 25 for firmly locking the blade in the holder, and a lock nut 33 is provided in conjunction therewith for locking the set screw 32 in holding position. As shown in Fig. 2, the cutting edge portion of the cutter blade is shaped to a slight curvature as viewed from the front end of the machine, and the lower ends of the side wall portions of the machine frame are similarly curved and shaped to complement the curvature of the cutter blade, whereby the tool is adapted to cut slightly arcuately shaped depressions in the work piece surface.

The cutting of the depressions in the work piece surface by the cutter blade 28 is accomplished by oscillations of the cutter holder 25 about the axis of the pivot pin 26. To this end the horizontal arm portion of the bell-crank shaped cutter holder is drilled and tapped to receive a bearing screw 36 which is vertically adjustable in the holder 25 and then fixed in adjusted position by means of a lock nut 37. The lower end of the screw 36 bears in sliding relation against an eccentric cam portion 38 carried by a drive shaft 40. The shaft 40 is rotatably carried within the tool frame by means of a bearing as indicated at 41 which is carried by partition wall devices interiorly of the frame.

The drive shaft 40 also mounts a gear wheel 44 which is arranged to be driven by a spur gear 46 carried by a countershaft 48 which is similarly carried by means of bearings 49–50 supported by partition devices interiorly of the tool frame. The countershaft 48 is driven by means of a gear wheel 52 which meshes with a spur gear 54 keyed to a stub shaft 56 which is similarly rotatably mounted within the machine frame as indicated at 57, and connects by means of a slip-fit spline connection as indicated at 58 with the drive shaft 59 of a pneumatic motor as indicated at 60.

The motor 60 may of course be of any suitable type; and may comprise any preferred form of pneumatic or electric or hydraulic motor, as preferred. However, in the example shown in the drawing, the motor 60 is of the pneumatic rotary type and is arranged to be controlled by means of a throttle valve stem as indicated at 62 (Fig. 1). The valve stem is in turn actuated by a lever 64 which is pivoted to the motor frame as indicated at 65 and arranged to be depressed at its free end by means of a push button 66 which carries a pin 67 and is manually depressible in a fixed bracket device 68 having notches 69 at various adjusted positions thereon. Hence, the throttle valve control lever 64 may be depressed and maintained in any desired position of adjustment for controlling the flow of compressed air through the air inlet conduit as indicated at 70 into the motor, whereby the motor will operate at the desired speed. The motor or exhaust outlet is indicated at 72, and is preferably connected by means of a conduit 74 into a passageway system interiorly of the tool frame bottom plate 14, as indicated at 76. A cross conduit as indicated at 77 is provided in the base plate portion 14 in communication with the passageway 76, and in turn leads into a series of air spray outlets 78 which thereby direct the exhaust air from the motor 60 against the top surface of the work piece in the region of the operation of the cutter blade 28 on the work piece. Thus, this arrangement provides for automatic blasting away of the chips of metal as they are cut out of the work piece, to keep the work area clear.

In order to operate the tool of the invention progressively across a work piece surface with maximum facility, the top plate portion of the tool frame structure is provided with an upstanding hand grip device as indicated at 80, whereby the tool operator may grasp the tool in one hand by means of a handle 80 while carrying it to the work piece. The tool is then set in place on top of the surface to be processed, and handled generally in the manner of a laundry iron; that is, the operator moves the tool either progressively in one direction back and forth over the surface to be de-smoothed. Furthermore, he may keep the tool on a steady "keel" or he may give it a slight rocking motion about either or both the fore and aft axis of the tool as indicated in Fig. 3, or about an axis transverse thereto.

Figure 5:
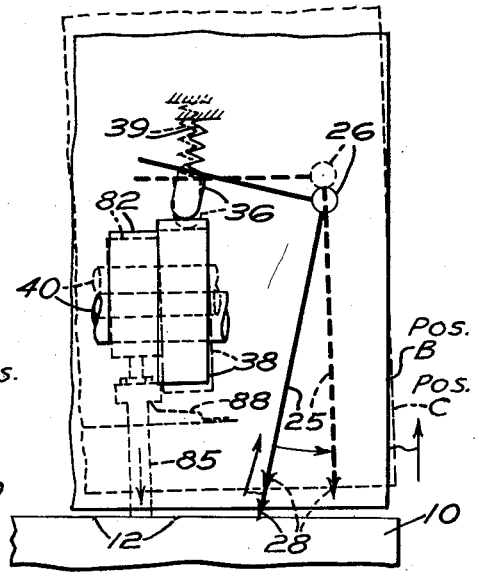

To further facilitate the progression of the tool over the surface to be processed, the drive shaft 40 is provided with a second cam wheel as indicated at 82 which is keyed to the shaft 40 in such a manner that the eccentricity thereof is substantially opposite to the eccentricity of the cutter operating cam wheel 38. The cam wheel 82 is arranged to bear downwardly against the upper end of the push-pin 84 which is screwthreaded into the upper end of a lift plate or shoe 85 which is arranged to be vertically slidable within the bottom plate 14 of the machine frame between a retracted position and a position extending below the bottom surface of the tool base plate; as indicated schematically for example in Fig. 5. A leaf spring 88 biases the lift shoe 85 upwardly into bearing contact with the cam wheel 82.

Figure 4:
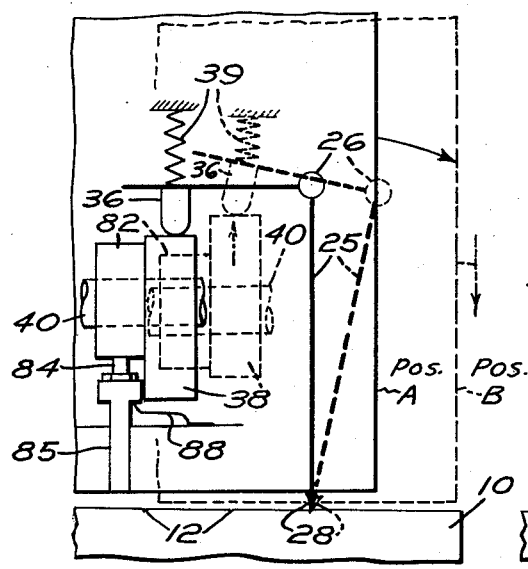
Figs. 4, 5, 6 are semi-diagrammatic views showing the tool and a portion of the work piece cutter actuating mechanism at various cutter positions within a cycle of operation thereof.
Figure 6:
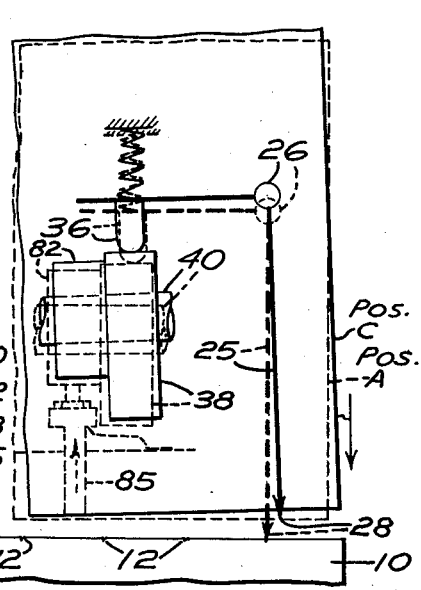

Thus, when the cutting edge of the cutter 28 is disposed in digging relation against the work piece as illustrated for example in Figs. 1 and 4, the lift shoe 85 is retracted upwardly within the tool. Then, as the cutter holder 25 pivots in counterclockwise direction (in response to further rotation of the cam wheel 38) as from the solid line position thereof to the broken line position thereof in Fig. 5, the lift shoe 85 simultaneously projects below the bottom surface of the tool frame to bear against the top surface of the work piece, thereby lifting the tool slightly and enabling the cutter 28 to swing forwardly to return into starting position without scuffing against the surface of the top plate. Then, as the drive shaft 40 rotates still further, the bell-crank shaped holder 25 starts to move again from the solid line to the broken line position thereof shown in Fig. 6, while the lift shoe 85 commences to retract upwardly into the tool frame, whereby the weight of the tool is again lowered onto the cutting edge of the cutter 28, whereupon the latter again digs into the work piece to provide an oil retaining depression therein as explained hereinabove.

Thus, it will be appreciated that the machine tool of the invention provides a mechanism which tends automatically to "walk" or hunch forwardly across a work piece surface while simultaneously digging the surface slightly, such as for example to depths of 1/1000th to 3/1000th inch, thereby providing depressions therein as indicated at 12 in the drawing suitable to retain lubricating oil supplies, as distinguished from a perfectly smooth surface. A compression spring 39 mounted above the horizontal arm of the bell-crank shaped holder 25 cooperates with the cam wheel 38 to cause the tool holder to oscillate as explained hereinabove. The height of the lift provided by the lift shoe 85 may be regulated by screwthreadedly adjusting the pin 84 in the upper end of the lift shoe. Similarly, the angular attitude of the tool holder 25 may be regulated by adjustment of the screw 36.

Whereas, only one form of the invention has been shown and described in detail, it will be apparent to those skilled in the art that the invention is not so limited but that various changes may be made therein without departing from the spirit of the invention or the scope of the appended claims.

I claim:

1. A flaking machine of hand tool form comprising a housing mounting a hand grip member thereabove, a motor carried by said housing, a drive shaft driven by said motor, a first cam keyed to said drive shaft and arranged to bear against one arm portion of a spring-pressed bell-crank shaped holder, said holder being pivotally mounted within said frame to oscillate thereon, a cutter tool adjustably mounted upon said holder, whereby rotation of said drive shaft and said cam will cause said holder to oscillate, thereby alternately digging said cutter tool edge into the work piece and retracting therefrom, a second cam carried by said drive shaft to rotate therewith, the eccentricities of said cams being substantially opposite, and a spring-pressed lift shoe vertically slidable within said housing and coupled to said second cam for vertical reciprocation thereby between retracted and extended positions relative to the bottom surface of said tool housing, whereby said lift shoe is arranged to project downwardly below said housing into bearing relation against the work piece for lifting said tool away from said work piece during the phase of oscillation of said tool holder when returning the cutting edge portion of said tool toward starting position intermediately of each digging operation of said cutter into the work piece.

2. A de-smoothing machine of hand tool form comprising a housing mounting a hand grip member thereabove, a motor carried by said housing, a drive shaft driven by said motor, a first cam keyed to said drive shaft, a tool holder pivotally mounted within said frame, a cutter tool adjustably mounted upon said holder, means whereby rotation of said first cam will cause said holder to oscillate thereby alternately moving said cutter tool edge back and forth relative to the work piece, a second cam carried by said drive shaft to rotate therewith, the eccentricities of said cams being substantially opposite, and a lift shoe vertically slidable within said housing and actuated by said second cam for vertical reciprocation thereby between retracted and extended positions relative to the bottom surface of said tool housing, whereby said lift shoe is arranged to periodically project downwardly below said housing into bearing relation against the work piece for lifting said tool away from said work piece during return of the cutting edge portion of said tool toward starting position intermediately of each digging operation of said cutter into said work piece.

3. A flaking machine of hand tool form comprising a housing including a hand grip member, a motor carried by said housing, a holder pivotally mounted upon said housing to oscillate thereon, a cutter tool adjustably mounted upon said holder, a first crank means interconnecting said motor and said holder whereby operation of said motor will cause said holder to oscillate, thereby reciprocating said cutter tool edge longitudinally of the tool housing while extending below the bottom thereof, a second crank means connected to said motor to be driven thereby, the eccentricities of said crank means being substantially opposite, and a spring-pressed lift shoe vertically slidable within said housing and coupled to said second crank means for vertical reciprocation thereby between retracted and extended positions relative to the bottom surface of said tool housing, whereby said lift shoe is arranged to project downwardly below said housing into bearing relation against the work piece for lifting said tool away from said work piece during the phase of reciprocation of said tool edge when returning toward the front end of said tool.

4. A de-smoothing machine of hand tool form comprising a housing including a hand grip member, a motor carried by said housing, a first cam driven by said motor, a tool holder pivotally mounted within said frame, a cutter tool adjustably mounted upon said holder to protrude at its cutting edge below said tool housing, means whereby rotation of said first cam will cause said holder to oscillate thereby alternately reciprocating said cutter tool edge longitudinally of the tool housing, a second cam connected to said motor to be driven thereby, the eccentricities of said cams being substantially opposite, and a lift shoe vertically slidable within said housing and actuated by said second cam for vertical reciprocation thereby between retracted and extended positions relative to the bottom surface of said tool housing, whereby said lift shoe is arranged to periodically project downwardly below said housing into bearing relation against the work piece for lifting said tool away from said work piece during return of the cutting edge portion of said tool toward the front end portion of the tool.

5. A flaking machine of hand tool form comprising a housing mounting a hand grip member thereabove, a motor carried by said housing, a drive shaft driven by said motor, a cam keyed to said drive shaft and connected to a tool holder pivotally mounted within said frame, a cutter tool having an arcuately profile chisel-like edge adjustably mounted upon said holder to extend at its lower cutting edge portion beyond the bottom profile of said housing, whereby rotation of said drive shaft and said cam will cause said tool edge to reciprocate longitudinally of said tool, a second cam carried by said drive shaft to rotate therewith, the eccentricities of said cams being substantially opposite, and a spring pressed lift shoe vertically slidable within said housing and coupled to said second cam for vertical reciprocation thereby between retracted and extended positions relative to the bottom surface of said tool housing, whereby said lift shoe is arranged to project downwardly below said housing into bearing relation against the workpiece for lifting said tool away from said workpiece during oscillations of said tool holder in such direction as to return the cutting edge portion of said tool toward starting position at the front end portion of said tool.

6. A flaking machine of hand tool form comprising a housing mounting a hand grip member thereabove, a pneumatic motor carried by said housing, a drive shaft driven by said motor, a throttle valve for manual control of the speed of said motor, a cam keyed to said drive shaft and connected to a tool holder being pivotally mounted within said frame, a cutter tool adjustably mounted upon said holder to extend at its lower cutting edge portion beyond the bottom profile of said housing, whereby rotation of said drive shaft and said cam will cause said tool edge to reciprocate longitudinally of said tool housing, a second cam carried by said drive shaft to rotate therewith, the eccentricities of said cams being substantially opposite, and a spring pressed lift shoe vertically slidable within said housing and coupled to said second cam for vertical reciprocation thereby between retracted and extended positions relative to the bottom surface of said tool housing, whereby said lift shoe is arranged to project downwardly below said housing into bearing relation against the workpiece for lifting said tool away from said workpiece during oscillations of said tool holder in such direction as to return the cutting edge portion of said tool toward starting position at the front end portion of said tool, and conduit means within said housing conveying the air exhaust from said motor to a point of jet discharge adjacent said tool cutting edge for air-blasting the refuse chips away from the site of the cutting action.

References Cited in the file of this patent

UNITED STATES PATENTS

| 692,028 | Page | Jan. 28, 1902 |

FOREIGN PATENTS

| 382,175 | Great Britain | Oct. 20, 1932 |
| 493,237 | Germany | Mar. 20, 1928 |
| 507,180 | France | Sept. 7, 1920 |